Patented Oct. 16, 1923.

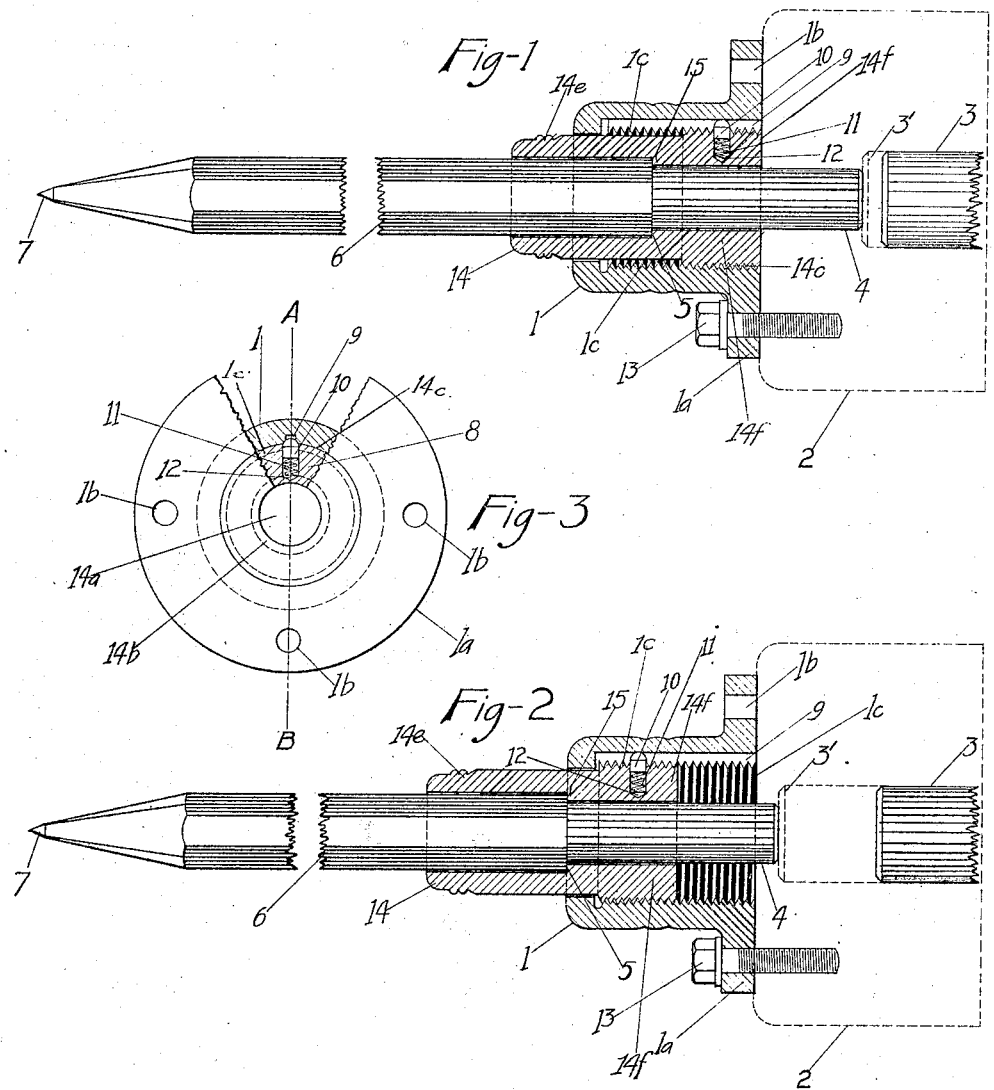

1,470,645

UNITED STATES PATENT OFFICE.

JOHN J. ROBERTS, OF LOUISVILLE, KENTUCKY.

PORTABLE RECIPROCATING POWER TOOL.

Application filed October 25, 1920. Serial No. 419,470.

*To all whom it may concern:*

Be it known that I, JOHN J. ROBERTS, a citizen of the United States, residing at Louisville, in the county of Jefferson and the State of Kentucky, have invented new and useful Improvements in Portable Reciprocating Power Tools, of which the following is a specification.

My invention relates to portable reciprocating power tools such as electric and pneumatic hammers for riveting, stone-drilling, stone-carving, etc., wherein have been devised and invented a new and useful design in the construction and the operation of the nozzle and the chuck for holding the bits and new and useful means of adjusting and controlling the hammer end of the shanks of said bits within the zone of operation of the plungers of said reciprocating tools.

The objects of my invention are,— (1) to devise for a portable reciprocating power tool new and useful means for readily changing the strength and rapidity of the hammer strokes of said tool at the will of the operator during its operation; (2) to construct for the nozzle of a power hammer a new adjustable extension bit chuck adapted to hold the bit in alignment with the movement of the hammer head of said power tool and adapted to hold said bit rigidly in one position with relation to the chuck; (3) to provide for a power hammer a novel adjustable extension chuck threaded to screw longitudinally into the nozzle of said hammer, and means for confining the movement of said extension chuck inward and outward within certain predetermined limits. (4) to design for a power hammer a new and useful movable bit chuck for holding the shank of the bit in a position to be pounded upon by the hammer head as it moves through its normal operative zone, novel means for readily moving said chuck and bit a greater or less distance into said operative zone to change the strength and rapidity of the hammer strokes and means for holding said chuck and bit fixed in a predetermined position in said operative zone.

All of these objects are attained in the present invention, and the improvements in reciprocating power tools, electric and pneumatic hammers for riveting, stone-drilling, stone-carving, etc., illustrated in the accompanying drawings which form a part of this specification, is a practicable apparatus embodying the aforesaid novel extension chuck, operative means and other new and useful details of construction, arrangement and combination of parts, all of which, together with their functions will be described in detail with reference to said drawings, and will be definitely pointed out in the claims that follow the description.

In said drawings, Figs. 1 and 2 are longitudinal sections in the plane AB of Fig. 3, showing my threaded nozzle attached to the lower end of the casing of a power hammer. In these Figures 1 and 2 also appear in their operative positions longitudinal sections of my extension bit chuck together with an elevation of the cutting bit broken and a fragment of the hammer head of said power hammer.

In Fig. 1 may be seen my new adjustable extension chuck screwed back into the nozzle as far as possible and holding the bit-shank in its innermost operative position for the shortest and most rapid strokes. But in Fig. 2 may be seen these same parts with my new extension chuck screwed outwardly as far as possible and holding the bit-shank in its outermost position for getting the longest possible stroke from the hammer head of said power tool.

Fig. 3, is an elevation of the bottom of my nozzle in first angle projection, with a part broken away to show my controlling detent in elevation and a partial cross section of the nozzle, extension chuck and detent slot therein.

My invention has been developed for general use in electric and pneumatic hammers to which it may be readily attached or fitted. With this general purpose and special objects aforesaid in view I will now describe my invention in detail, pointing out and explaining the uses and the operations of the various parts and combinations thereof throughout my invention as illustrated in the drawings hereinabove specified, in which similar letters and characters refer to similar parts throughout the several views.

In Figs. 1 and 2, 1 is the threaded nozzle that may be fitted to the casing of any reciprocating power tool in some suitable way, as by means of cap screws 13, the dotted line 2 representing the relative position of said casing. In Figs. 1, 2 and 3, 1$^a$ indicates the base of said nozzle, 1$^b$ indicates the perforations in said base for the attaching cap screws 13, and 1ᶜ, the nozzle threads.

In Figs. 1 and 2, the numeral 3 indicates the hammer head of the reciprocating power tool drawn back to its extreme inner position for delivering its full stroke upon the head end of shank 4 in Fig. 2, in which the dotted line 3′ shows the position of said hammer head in the delivery of its full stroke upon the head of shank 4 in its normal position. The space between 3 and 3′, Fig. 2, shows the normal zone of operation of the hammer head 3. And in Fig. 2 may be seen the bit 6 provided with a chisel 7 normally seated in my extension chuck 14, the cylindrical shank 4 of said bit extending through the chuck's axial boring 14ᵃ, seen in Fig. 3, and the larger hexagonal portion 6 extending down into the counterboring 14ᵇ as outlined in Fig. 3, so that the shank shoulder 5 fits rigidly against the chuck shoulder 15 formed by the counterboring 14ᵇ, Figs. 1 and 2. In Fig. 3 nozzle threads 1ᶜ and chuck threads 14ᶜ are shown only in outline.

In Fig. 2 it should be observed that the larger portion 14ᶠ of the chuck 14, provided with chuck threads 14ᶜ has been screwed into its extreme outer position against the inner part of the nozzle 1. It can be readily seen that when bit 6 is placed into the tool for operation and chisel 7 is pressed against the stone for cutting work; shank shoulder 5 will be pressed rigidly against chuck shoulder 15 and the head end of shank 4 will stand in through tool casing 2 just far enough to take the blows of the plunging hammer head 3 passing through its full zone of operation from 3 to 3′, as seen in Fig. 2, and delivering its longest strokes; but when the operator places his fingers on chuck 14 at the knurled ring 14ᵉ he can readily turn chuck 14 and screw it along the threads 1ᶜ into nozzle 1. This inward movement of chuck 14 allows bit 6 to sink back into nozzle 1, and as the larger threaded portion 14ᶠ of chuck 14 advances toward the tool casing 2, shank 4 advances inwardly toward hammer head 3 encroaching more and more into the operative zone 3′, 3 of hammer head 3, and so shortens the hammer stroke giving greater frequency of stroke per minute for the expenditure of a given amount of energy.

In the practical operation of the reciprocating power tool it is often desirable to set the extension in place for a certain length of stroke and so to hold the shank 4 in a position fixed for continuous work. This control of the movement of chuck 14 in my invention is accomplished in the following way: In the inner threaded part of nozzle 1 a longitudinal key slot 9, Figs. 1, 2 and 3, has been milled; and into the larger threaded portion 14ᶠ of the extension chuck 14 has been sunk a boring 12, into which has been fitted a helical compression spring 11 and a round-headed plunger 10 adapted to be pushed outwardly by said spring, so that, while chuck 14 is being turned in the nozzle 1, the round head of plunger 10 rides readily over the nozzle threads 1ᶜ until the key slot 9 is reached, into which plunger 10 forced by spring 11, jumps holding chuck 14 from turning further until the operator again places his fingers upon the knurled ring 14ᵉ and twists chuck 14 with a torque sufficient to press the round head of plunger 10 with a side sweep out of the slot 9, and then another rotation of the extension chuck can be made and the shank 4 set in any other position for a different length stroke.

Fig. 1 shows the threaded portion 14ᶠ of my extension chuck screwed back against the tool casing 2 and the shank 4 at its extreme inner position, giving us, consequently, the shortest and the most rapid stroke of the hammer head 3 under these conditions.

Having thus described the features of my invention, the operation, construction, arrangement and combination of its parts, what I claim in my invention as new and useful and desire to have outlined and specified in Letters Patent, is set forth specifically in the following claims.

Claims:

1. In a power hammer, the combination of a casing, a reciprocating part within adapted to plunge in normal operation back and forth a predetermined distance, a nozzle attached to the hammer end of said casing and provided with threaded axial boring; a deep longitudinal slot in one side of the threaded boring, and a tool chuck adapted with threads to screw longitudinally back and forth in said nozzle, to lengthen or shorten the operative zone of said reciprocating part, an axial boring in said tool chuck, a counterboring in the outer end of said chuck, a bit provided with shank and shoulder adapted to fit slidably into said chuck a predetermined distance, a spring pressed detent radially disposed fitted in the side of said chuck and adapted in the screwing of said chuck inwardly or outwardly in said nozzle to spring into said longitudinal slot and hold said chuck from rotating further in normal operation, as described.

2. In an electric or pneumatic reciprocating tool, the combination of a casing, a hammer head, means for driving the head back and forth over a fixed zone of operation, a hollow cylindrical nozzle provided with internal threads and adapted to be securely attached to the end of said tool casing, a longitudinal slot along the inside of said nozzle, with an extension chuck provided with axial borings and with external threads adapted to fit the internal threads of said nozzle so that the chuck may be screwed inwardly or outwardly along said nozzle, a detent slidably fitted into the side of said chuck and adapted to engage the longitudinal slot inside said nozzle once in every full revolution of said chuck in normal operation and a bit having a shank and a shoulder adapted to fit closely into the axial borings in said chuck a predetermined distance to take the blows of the hammer head, substantially as described.

3. In a reciprocating power tool having a casing and a hammer head within adapted in normal service to move back and forth through a predetermined zone of operation, the combination of a bit having a shank and a shank shoulder, a chuck for holding said bit, and axial boring through said chuck for the shank to pass through, a counterboring in the outer end of said chuck to admit the shank shoulder of said bit a predetermined distance, internal threads in said nozzle, external threads in said chuck adapted to fit the nozzle threads, a longitudinal key slot through the nozzle threads, with a radial boring in the threaded side of said chuck, a round headed detent pin adapted to fit loosely in said radial boring, and a helical compression spring adapted to fit into the bottom of the radial boring and to push continually against the said detent pin to cause the rounded head of said pin to plunge into said key slot at every revolution of said chuck to hold the chuck from further turning under the stress of normal operation, substantially as described.

4. In a reciprocating power tool having a casing and a hammer head within adapted in normal operation to move back and forth through a predetermined range of stroke, an extension chuck adapted to hold a bit shank rigidly standing through said chuck a predetermined distance, a knurled ring on the outer end of said chuck for turning it, threads on the inner end of the chuck, a nozzle adapted to be attached to said casing and to hold said chuck, internal threads in said nozzle adapted to take the threads of said chuck so that the chuck carrying the bit shank in normal operative position to admit a long range of hammer stroke, as in Fig. 2, may be screwed inwardly to any desirable position to admit a shorter hammer stroke, as in Fig. 1, and a key slot in said nozzle and a spring-pressed plunging detent in said chuck adapted to plunge into the slot at every revolution of the chuck to hold said bit shank securely in position to allow any desirable length of stroke, substantially as described.

In testimony whereof, I have hereunto set my signature in the presence of two witnesses.

JOHN J. ROBERTS.

Witnesses:
  Geo. E. Schuman,
  Alexander C. Schuman.